United States Patent

Baumert et al.

[19]

[11] Patent Number: 6,067,300
[45] Date of Patent: May 23, 2000

[54] METHOD AND APPARATUS FOR OPTIMIZING THE TRANSFER OF DATA PACKETS BETWEEN LOCAL AREA NETWORKS

[75] Inventors: Robert J. Baumert, Allentown; Anthony W. Seaman, Bethlehem; Sherre M. Staves, Pennsburg, all of Pa.

[73] Assignee: Cabletron Systems, Inc., Rochester, N.H.

[21] Appl. No.: 09/096,110

[22] Filed: Jun. 11, 1998

[51] Int. Cl.[7] .............................. H04L 12/28; H04L 12/56
[52] U.S. Cl. ........................ 370/413; 370/401; 370/235; 709/223; 709/230; 710/10; 710/52
[58] Field of Search ................................... 370/401, 392, 370/412, 235, 402, 413; 709/223, 234, 250

[56] References Cited

U.S. PATENT DOCUMENTS

| | | |
|---|---|---|
| 5,434,976 | 7/1995 | Tam et al. ............................... 709/234 |
| 5,448,565 | 9/1995 | Chang et al. ........................... 370/402 |
| 5,633,865 | 5/1997 | Short ....................................... 370/412 |
| 5,758,075 | 5/1998 | Graziano et al. ....................... 709/250 |
| 5,764,895 | 6/1998 | Chung .................................... 709/250 |
| 5,805,816 | 9/1998 | Picazo, Jr. et al. .................... 709/223 |
| 5,878,028 | 3/1999 | Roy et al. ............................... 370/235 |

*Primary Examiner*—Hassan Kizou
*Assistant Examiner*—John Pezzlo
*Attorney, Agent, or Firm*—Freilich, Hornbaker & Rosen

[57] ABSTRACT

A switch apparatus for optimizing the transfer of data packets between a plurality of local area networks (LANs). Apparatus of the present invention are comprised of multiple independent controllers, e.g., a receive controller and a transmit controller, which share common resources including a first memory (a packet memory) which stores the data packets, a second memory (a descriptor memory) which stores pointers to the stored data packets, and buffered data paths (preferably using FIFO buffers). The independent controllers operate essentially concurrently for most tasks while interleaving their use of the shared resources. Consequently, embodiments of the present invention can simultaneously receive and transmit data across multiple LAN data ports (e.g., 28 Ethernet ports comprised of 10/100 and/or 10 Mbps ports).

12 Claims, 9 Drawing Sheets

METHOD AND APPARATUS FOR OPTIMIZING THE TRANSFER OF DATA PACKETS BETWEEN LOCAL AREA NETWORKS

BACKGROUND OF THE INVENTION

The present invention relates generally to a method and apparatus for transferring data packets between a plurality of local area networks (LANs) and more particularly to a switch architecture capable of high speed packet transfer between multiple data ports (e.g., 28 Ethernet ports comprised of 10/100 and/or 10 Mbps ports)

U.S. Patents directed to apparatus for switching or bridging LANs include U.S. Pat. Nos. 4,627,052; 4,715,030; 4,737,953; 4,922,503; 5,136,580, and 5,633,865.

SUMMARY OF THE INVENTION

The present invention relates to a method and apparatus for optimizing the transfer of data packets between a plurality of local area networks (LANs). Apparatus of the present invention are comprised of multiple independent controllers, e.g., a receive controller and a transmit controller, which share common resources including a first memory (a packet memory) which stores the data packets, a second memory (a descriptor memory) which stores pointers to the stored data packets, and buffered data paths (preferably using FIFO buffers). The independent controllers operate essentially concurrently for most tasks while interleaving their use of the shared resources. Consequently, embodiments of the present invention can simultaneously receive and transmit data across multiple LAN data ports (e.g., 28 Ethernet ports comprised of 10/100 and/or 10 Mbps ports).

In accordance with a preferred embodiment, a system for selectively transferring data packets between a plurality of local area networks (LANs), wherein the data packets identify destination and source addresses comprises: (1) a plurality of media access controllers (MACs) each configured for receiving and transmitting data packets to and/or from a different LAN, the MACS including at least a first MAC associated with a first LAN for receiving data packets from the first LAN and a second MAC associated with a second LAN for transmitting data packets to the second LAN, (2) a MAC receive buffer for periodically receiving at least a portion of data packets from the MACs, (3) a MAC transmit buffer capable of operating concurrently with said MAC receive buffer for periodically transmitting at least a portion of data packets directed to the MACs, (4) a shared packet memory for storing a plurality of data packets, (5) a packet memory input buffer for periodically receiving and buffering at least a portion of data packets from the packet memory, (6) a packet memory output buffer capable of operating concurrently with said packet memory input buffer for periodically buffering and transmitting at least a portion of data packets to the packet memory, (7) a shared descriptor memory for storing descriptors pointing to the data packets stored within the packet memory, (8) an address table for correlating the destination address of each data packet with one of the MACs, (9) a receive controller for causing a data packet from the first MAC to be stored in the packet memory via the MAC receive buffer and the packet memory output buffer and for generating descriptors corresponding to the locations of the data packet within the packet memory, wherein the receive controller stores the descriptors in the descriptor memory in response to the address table and the destination address of the data packet, and (10) a transmit controller capable of operating concurrently with said receive controller for causing a data packet from the packet memory to be transmitted to the second MAC via the packet memory input buffer and the MAC transmit buffer according to descriptors stored within the descriptor memory.

In accordance with a further aspect of a preferred embodiment, the system additionally includes: (1) receive session registers for storing descriptors generated by the receive controller before the descriptors are stored in the descriptor memory and (2) transmit session registers for storing descriptors retrieved from the descriptor memory, wherein the transmit controller is responsive to the retrieved descriptors within the transmit registers for selecting data packets from the packet memory for transmission to the MACs.

In accordance with a still further aspect of a preferred embodiment, the aforementioned buffers are organized as first in first out buffers (FIFOs) capable of inputting data at a first rate and outputting data at a second rate.

In accordance with still another aspect of a preferred embodiment, the aforementioned buffers and the receive and transmit controllers are all implemented within a single integrated circuit package.

The novel features of the invention are set forth with particularity in the appended claims. The invention will be best understood from the following description when read in conjunction with the accompanying drawings.

DESCRIPTION OF THE PREFERRED EMBODIMENTS

The present invention relates to a method and apparatus for optimizing the transfer of data packets between a plurality of local area networks (LANs).

Figure 1:
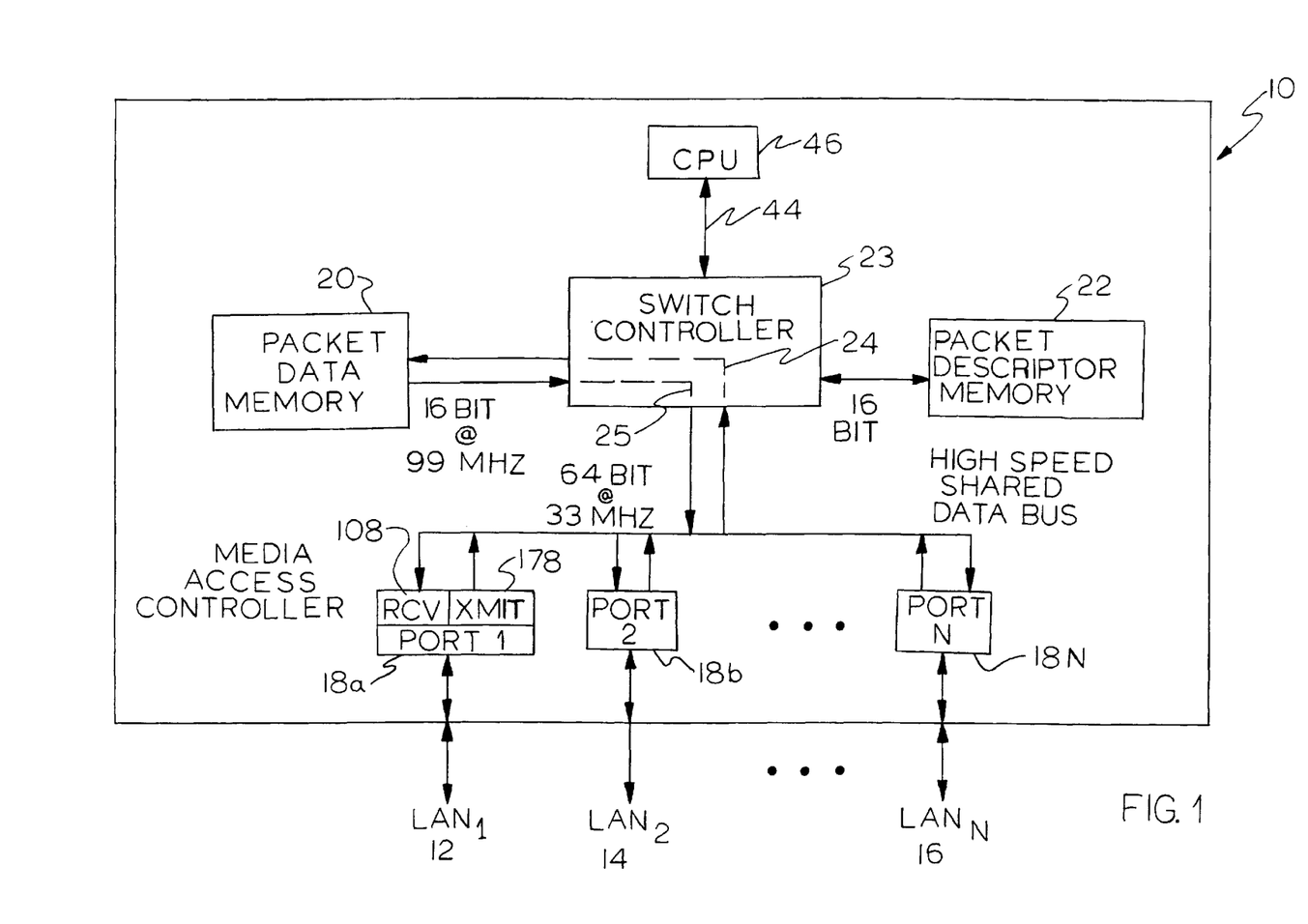
FIG. 1 comprises a top level functional block diagram of a preferred system for optimizing the transfer of data packets between a plurality of local area networks (LANs) using a switch controller.

FIG. 1 shows a functional block diagram of a preferred system 10, commonly known as a switch, for optimizing the transfer of data packets between a plurality of local area networks (LANs) e.g., 12, 14, and 16, according to data contained within each data packet (described further below in reference to FIG. 3). The system 10 is primarily comprised of (1) a plurality of media access controllers (MACs) 18 each corresponding to a different LAN 12, 14, 16 for bidirectionally transferring data packets, (2) a shared packet data memory 20 (preferably RAM and referred to as packet memory) for storing data packets prior to transferring to another LAN, (3) a shared packet descriptor memory 22 (preferably RAM and referred to as descriptor memory) for storing pointers identifying the location of the data packets in the packet memory 20, and (4) a switch controller 23 defining a receive data path 24 and a transmit data path 25 for concurrently transferring data in both directions between the MACs 18 and the packet memory 20. To accomplish this concurrent data transfer on the receive 24 and transmit 25 data paths, the switch controller 23 periodically shares resources including the packet memory 20 and the descriptor memory 22. As used herein, the term periodic is intended to refer to events occurring at regular or irregular intervals. The independent controllers within the switch controller 23 operate essentially concurrently for most tasks while interleaving their use of the shared resources. Consequently, embodiments of the present invention can simultaneously receive and transmit data across multiple LAN data ports, e.g., $LAN_1$ 12, $LAN_2$ 14, $LAN_N$ 16, etc., via a plurality of media access controllers 18. For example, Table I shows a simplified example of multiple receive tasks, i.e., a first data packet $RX_1$ being received from a first $LAN_1$ (column 2) and a second data packet $RX_2$ being received from a second $LAN_2$ (column 3), being processed concurrently with a third data packet $TX_3$ being transmitted on a third $LAN_3$ (column 4) in a time distributed manner during each time slot $T_X$. Preferably, the time slots $T_X$ can have variable durations for each task, e.g., as needed for a particular subtask. For example, the transmit task of column 4 may overlap different portions of the receive tasks and may have unequal time slot durations.

Additionally, the media access controllers 18 preferably interface to the LANs via a PHY, i.e., a physical interface layer, (not shown). In an exemplary implementation, 28 Ethernet ports comprised of 10/100 and/or 10 Mbps ports are simultaneously supported.

TABLE I

| $T_0$ | $RX_1$ to $MAC_1$ from $LAN_1$ | $RX_2$ to $MAC_2$ from $LAN_2$ | $TX_3$ from Packet Memory to $MAC_3$ on Transmit Data Path |
|---|---|---|---|
| $T_1$ | $RX_1$ from $MAC_1$ to Packet Memory on Receive Data Path | | $TX_3$ to $LAN_3$ from $MAC_3$ |
| $T_2$ | | $RX_2$ from $MAC_2$ to Packet Memory on Receive Data Path | |

Figure 2:
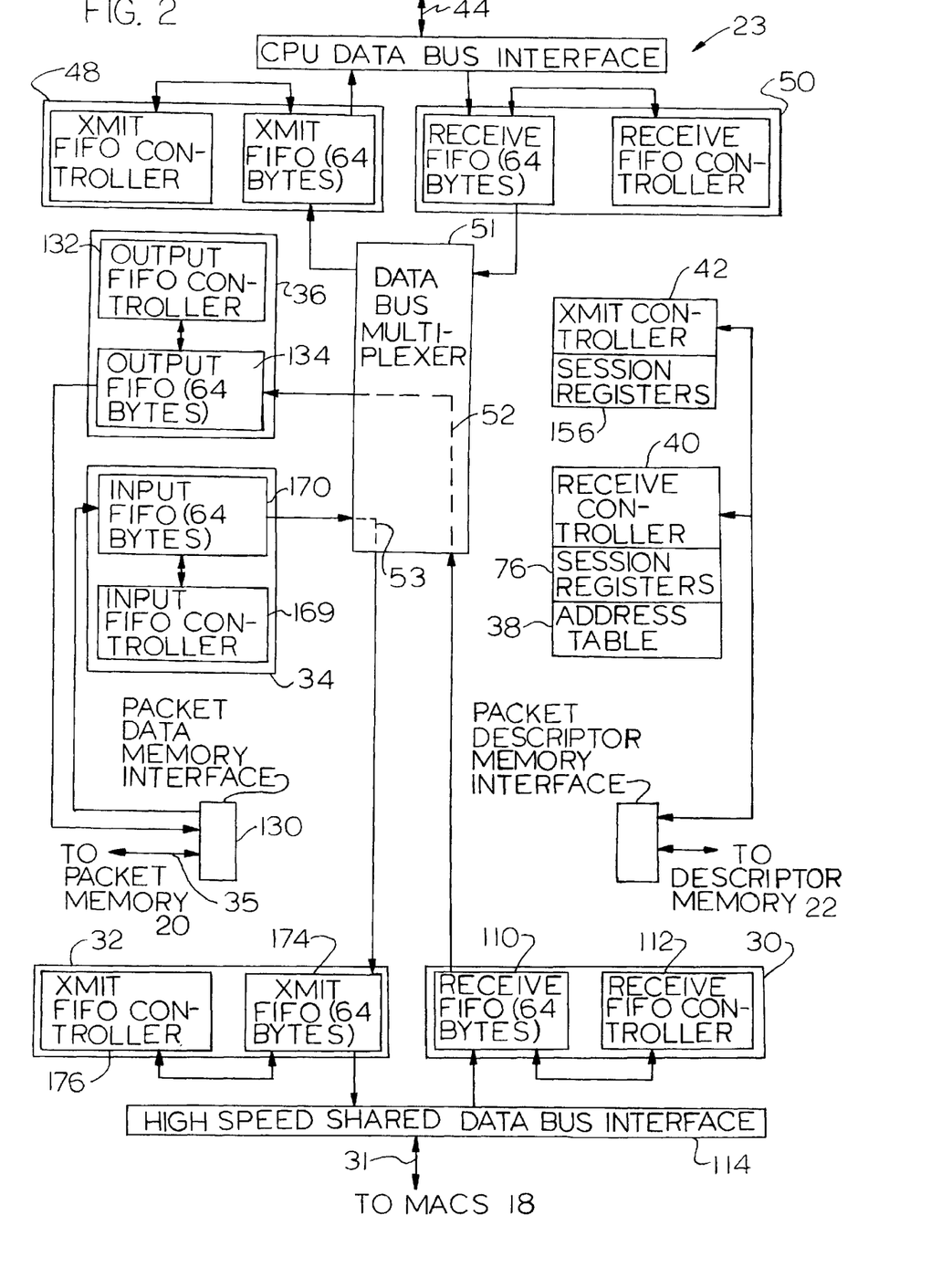
FIG. 2 comprises a functional block diagram of the switch controller of FIG. 1.

FIG. 2 shows the switch controller 23 of FIG. 1 primarily comprised of (1) a MAC receive (RCV) buffer 30 for periodically receiving and buffering at least a portion of data packets from the MACs 18 via a bidirectional MAC interface bus 31, (2) a MAC transmit (XMIT) buffer 32 capable of operating concurrently with the MAC receive buffer 30 for periodically buffering and transmitting at least a portion of data packets directed to the MACs 18 via the MAC interface bus 31, (3) a packet memory input buffer 34 for periodically receiving and buffering at least a portion of data packets from the packet memory 20 via a bidirectional packet memory interface bus 35, (4) a packet memory output buffer 36 capable of operating concurrently with the packet memory input buffer 34 for periodically buffering and transmitting at least a portion of data packets to the packet memory 20 via the packet memory interface bus 35, (5) an address table 38 for correlating the destination address of each data packet with one of the MACs 18 and its corresponding LAN, (6) a receive (RCV) controller 40 for causing a data packet from a first MAC, e.g., 18a, to be stored in the packet memory via the MAC receive buffer 30 and the packet memory output buffer 36 and for generating descriptors corresponding to the locations of each data packet within the packet memory 20, wherein the receive controller 40 stores descriptors in the descriptor memory 22 in response to the contents of the address table 38 and the destination address within the data packet, and (7) a transmit (XMIT) controller 42 for causing a data packet from the packet memory 20 to be transmitted to a second MAC, e.g., 18b, via the packet memory input buffer 34 and the MAC transmit buffer 32 according to descriptors stored within the descriptor memory 22. Additionally, embodiments of the invention preferably include a CPU interface bus 44 to a CPU 46 which can monitor and/or alter the flow of data within the switch controller 23. Associated with the CPU interface bus 44 is a CPU transmit (XMIT) buffer 48 and a CPU receive (RCV) buffer 50 which perform a similar function to that of the MAC transmit 32 and receive 30 buffers. Additionally, when the CPU interface bus 44 is present, a multiplexer 51 under control of the transmit 42 and receive 40 controllers is used to direct data between the packet memory 20 to either the MACs 18 or the CPU 46 via its associated buffered interfaces 31, 35, and 44. When not used with a CPU, the MAC receive buffer 30 is essentially coupled to the packet memory output buffer 36 via path 52 to form the receive data path 24. Similarly, the MAC transmit buffer 32 is essentially coupled to the packet memory input buffer 34 via path 53 to form the transmit data path 25.

As a consequence of the aforementioned structure, i.e., a plurality of concurrently operating buffered data paths (e.g., using buffers 30–36) sharing resources (e.g., memories 20–22), embodiments of the present invention are capable of concurrently receiving and transmitting data packets on a plurality of LANs by using a plurality of controllers (e.g., 40–42) which concurrently process portions of data packets. For example, Table II shows an expanded view of the simplified example previously shown in Table I corresponding to the preferred implementation of the receive 24 and transmit 25 data paths shown in FIG. 2.

TABLE II

| $T_0$ | $RX_1$ to $MAC_1$ from $LAN_1$ | $RX_2$ to $MAC_2$ from $LAN_2$ | $TX_3$ Descriptors from Descriptor Memory |
|---|---|---|---|
| $T_1$ | $RX_1$ to MAC Receive Buffer | | $TX_3$ from Packet Memory to Packet Memory Input Buffer |
| $T_2$ | $RX_1$ from MAC Receive Buffer to Packet Memory Output Buffer | | $TX_3$ from Packet Memory Input Buffer to MAC Transmit Buffer |
| $T_3$ | $RX_1$ from Packet Memory Output Buffer to Packet Memory | $RX_2$ to MAC Receive Buffer | |
| $T_4$ | $RX_1$ Descriptors to Descriptor Memory | $RX_2$ from MAC Receive Buffer | $TX_3$ to $MAC_3$ from MAC Transmit |

TABLE II-continued

| | to Packet Memory Output Buffer | Buffer |
|---|---|---|
| $T_5$ | $RX_2$ from Packet Memory Output Buffer to Packet Memory | $TX_3$ from $MAC_3$ to $LAN_3$ |
| $T_6$ | $RX_2$ Descriptors to Descriptor Memory | |

Figure 3:
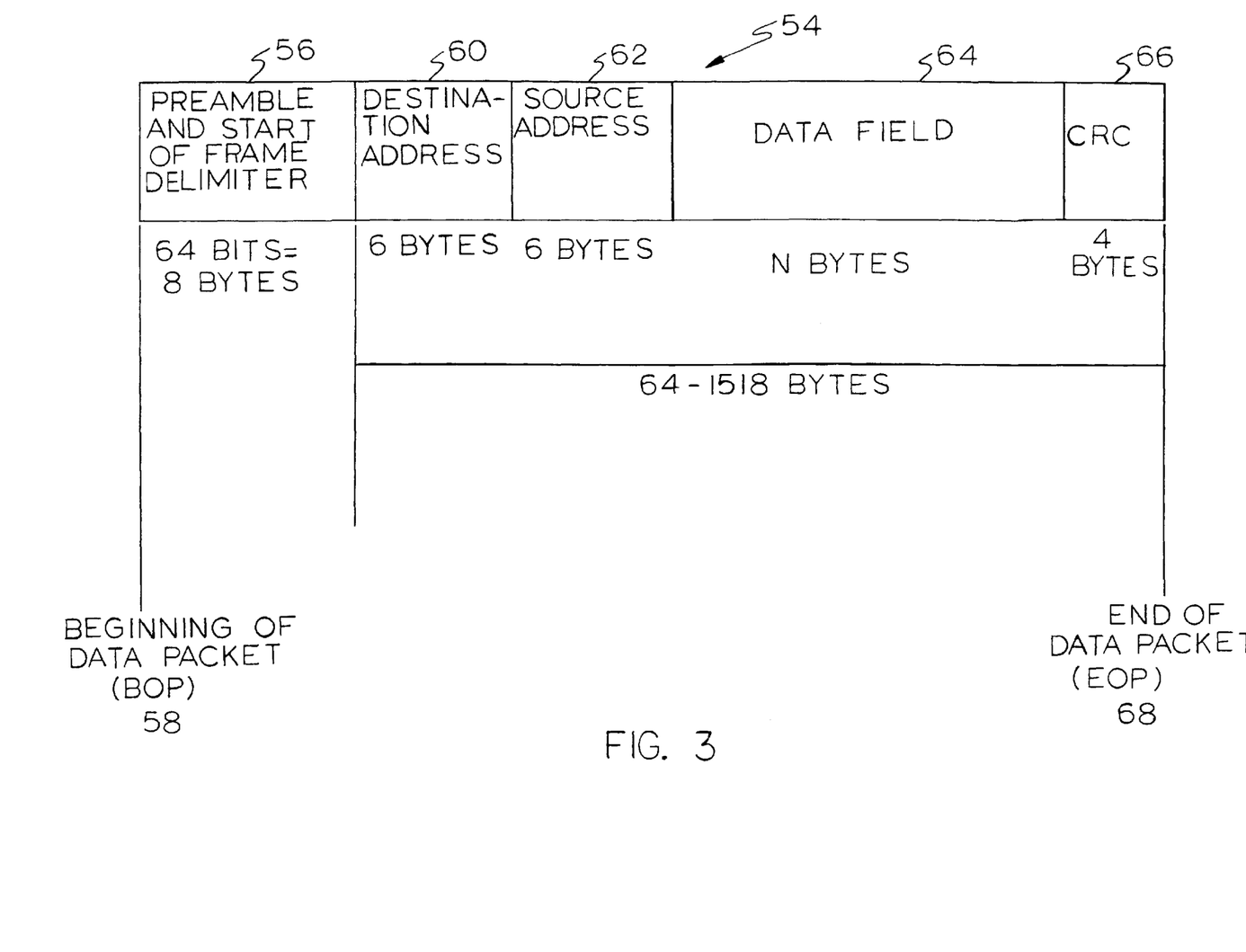
FIG. 3 shows the basic format of an exemplary data packet transferred by the present invention.

FIG. 3 shows the basic structure of an exemplary received data packet 54 (e.g., for an Ethernet data transfer protocol) comprised of (1) a preamble 56 for designating the beginning of the data packet 58 (BOP), (2) a destination address (DA) 60 for identifying a destination device present on a destination LAN, e.g., $LAN_2$ 14, (3) a source address 62 (SA) for identifying an originating device present on a source LAN, e.g., $LAN_1$ 12, (4) a data field 64 containing the information content of the data packet 54, and (5) a CRC field 66 at the end of the data packet (EOP 68) for performing an integrity check on the contents of the data packet 54. The overall length of the data packet 54 (absent the preamble 56) is variable between a minimum length of 64 bytes and a maximum length of 1518 bytes.

Figure 4:
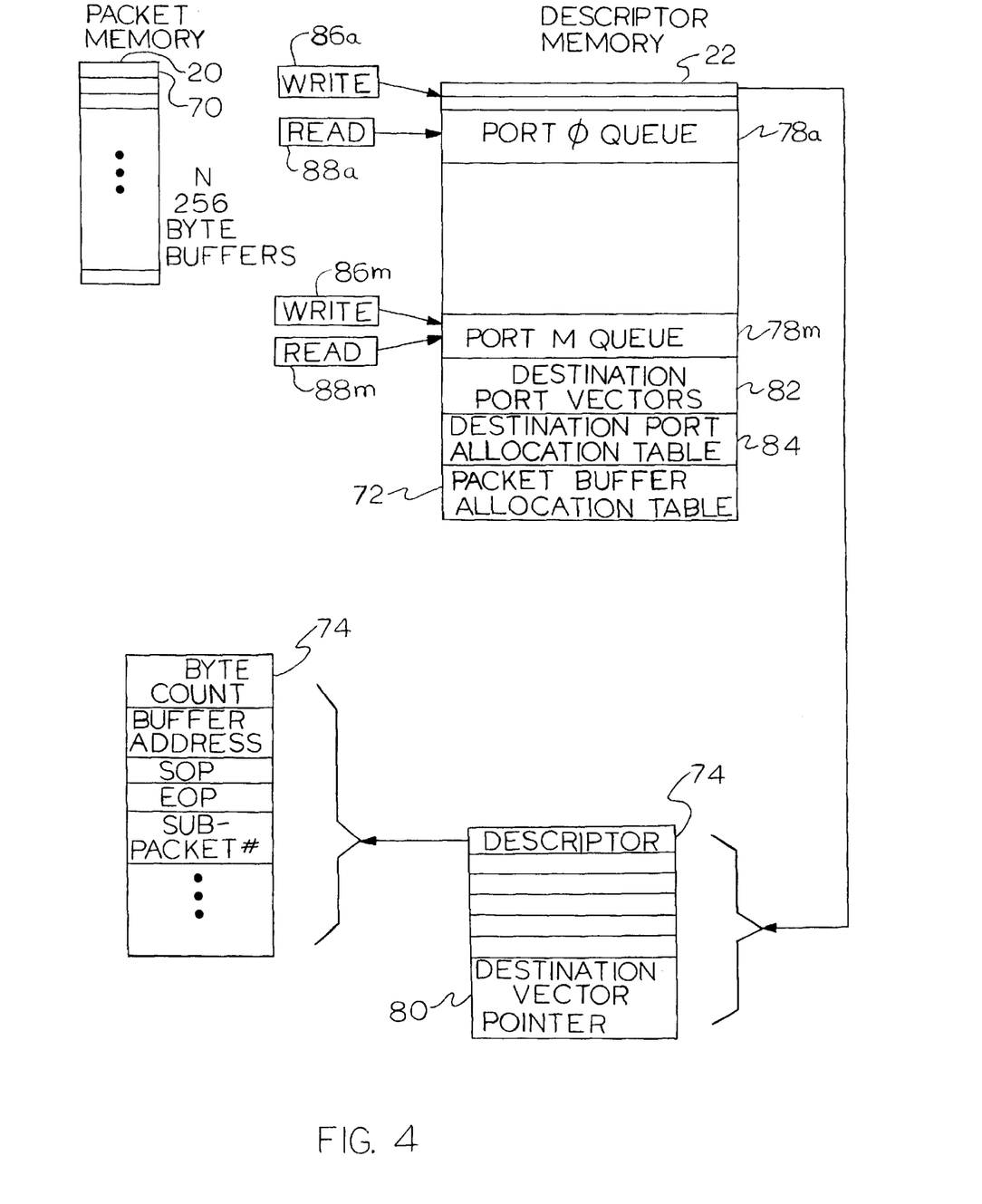
FIG. 4 shows a simplified block diagram of the data components allocated in the packet memory and descriptor memory of FIG. 1.

Received data packets 54 are stored in one or more buffers 70 within the packet memory 20 (see FIG. 4). Preferably the size of the buffers 70 is selected such that the smallest size data packet, i.e., 64 bytes, can fit within a single buffer 70 while the largest size data packet, i.e., 1518 bytes, will require a plurality of buffers 70. This buffer size selection, e.g., 256 bytes per buffer in a preferred embodiment, alternatively allows the size of the packet memory 20 to be reduced or the number of packets for a given packet memory size to be increased. For an exemplary implementation, a minimum of 219 buffers, each 256 bytes, are available for each port, i.e., each MAC 18 and its associated LAN interface. Accordingly for a 32 port system, the packet memory size would be 1,794,048 (219 * 256 * 32), preferably implemented in a 2 Mb block of memory. Since the data packet communication rate will typically be different on each port, the buffers 70 can be allocated on the fly between ports with low data packet communication rates to those with higher demands. As each buffer 70 is allocated, data is set in a packet buffer allocation table 72 stored within the descriptor memory 22, e.g., setting one of the N bytes in the packet buffer allocation table 72 corresponding to each packet memory buffer 70. Similarly, this data is reset when a buffer 70 is deallocated, freeing the buffer 70 for future data packets.

During the receive process, pointers, referred to as descriptors 74, are saved in receive session registers 76 which individually point to the buffers 70 that have been allocated for an incoming data packet. As described further below, once a complete data packet 54 has been successfully received, these descriptors 74 are copied from the receive session registers 76 to one of M output queues 78 (one for each MAC port connected to the switch controller 23) that are saved in the descriptor memory 22. Additionally, a destination vector pointer 80, associated with a set of (1–6) descriptors 74, is stored in the output queue 78. The destination vector pointer 80 points to a destination vector 82 also contained within the descriptor memory 22. Each destination vector 82 contains a bit corresponding to each potential destination port, e.g., a 32 bit destination vector can be used to allocate up to 32 destination ports. The destination port vectors 82 are allocated using a destination port allocation table 84 in a similar manner to the packet buffer allocation table 72.

Even in cases which require flooding, i.e., transmitting a received data packet 54 to multiple ports either because the destination port is not known or when the data packet is purposely broadcast to all ports, only a single destination port vector 82 is used for each received data packet 54. In operation, when flooding is required in a single VLAN case (i.e., when all of the physical ports of the switch are dedicated to single virtual LAN), descriptors 74 pointing to the buffers 70 which contain the received data packet 54 and the destination vector pointer 80 are stored in each of the output queues 78 (with the exception of the port associated with the LAN where the data packet originated). Similar operations occur in the case of a multicast data packet, in that descriptors 74 and a destination vector are stored in each of prescribed output queues 78. As the received data packet 54 is transmitted on each queued output port, i.e., a LAN via its associated MAC 18, the corresponding bit is cleared in the single destination port vector 82 associated with the received data packet 54. However, it is not until all of the bits in the destination port vector 82 are cleared that the commonly used buffers 70 for the stored data packet can be deallocated in the packet buffer allocation table 72. At that time, the destination port vector 82 is deallocated in the destination port allocation table 80. More commonly, a data packet 54 is directed, i.e., unicast, to a single destination address 60 on a known port, i.e., LAN. In this case, only a single bit corresponding to the one destination port is set in the destination port vector 82 and after transmission to this single port, both the buffers 70 and the destination port vector 82 are both deallocated.

Preferably, write 86 and read 88 pointers are contained within the switch controller 23 for each of the output queues 78. Preferably, the queues 78 are organized as circular (ring) buffers, i.e., so that data entries following the physical end of each queue 78 are located at the physical beginning of the queue 78. The write pointer 86 points to the last entry stored in the queue 78 and the read pointer 88 points to the last entry read from the queue 78. Whenever the read pointer 88 does not equal the write pointer 86, it signifies that there is new data (pointing to a received data packet) within the queue 78. However, if the write pointer 86 were permitted to loop around the read pointer 88, the queue 78 would lose data. Accordingly, in a preferred embodiment, (1) the write pointer is not permitted to loop the read pointer and instead the most recently received data packet is dropped and (2) the queue size is made large enough, 256 entries long in an exemplary embodiment, to reduce the probability that a data packet would be dropped. Since the number of queue entries required for a particular data packet varies from a minimum of 2 (1 descriptor 74 plus a destination vector pointer 80) to a maximum of 7 (6 descriptors 74 plus a destination vector pointer 80), the amount of data packets 54 that can be referenced from the queue 78 also varies from 128 for a minimum size packet to 36 for a maximum size packet in an exemplary embodiment having a 256 entry queue.

Figure 5:
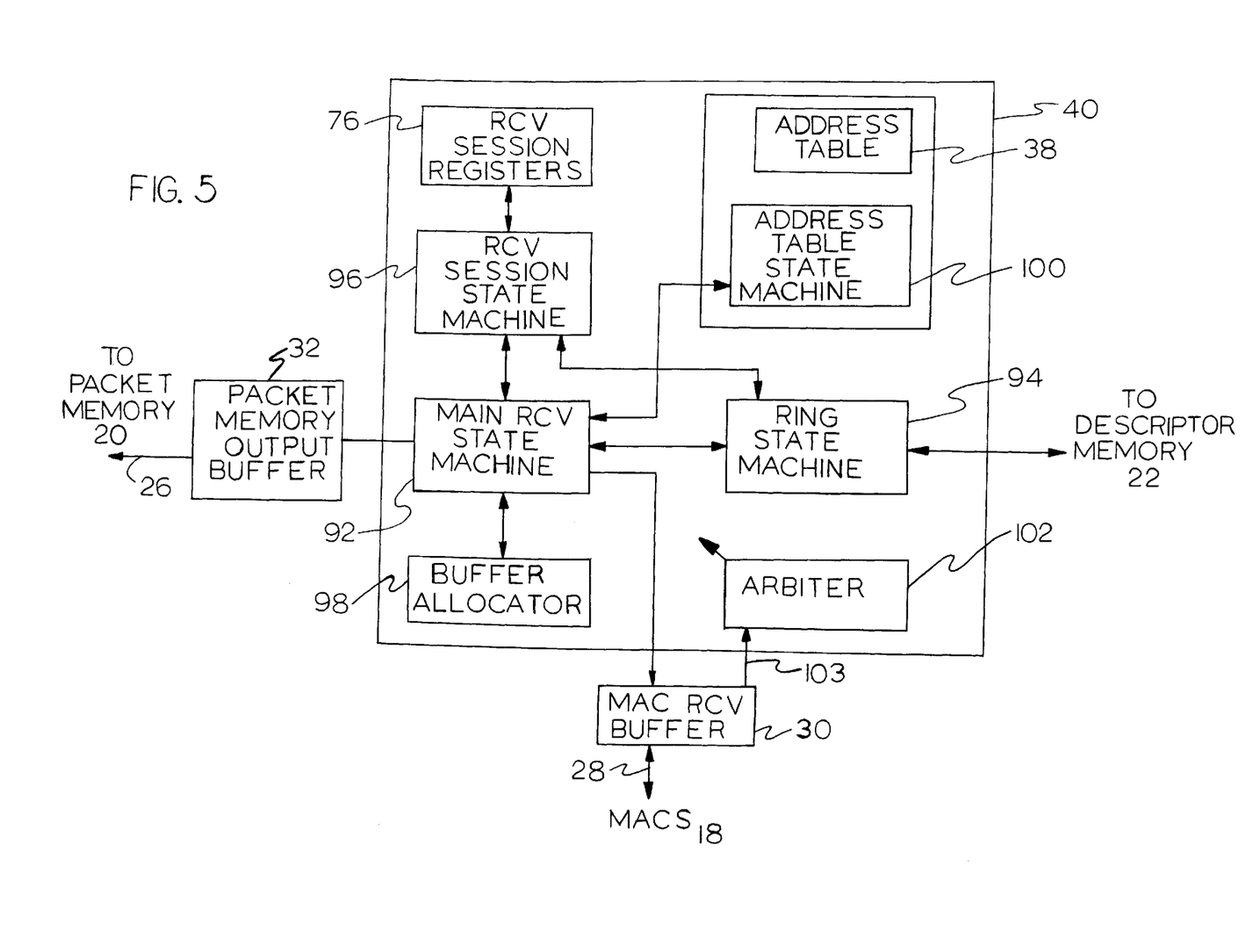
FIG. 5 shows an exemplary functional block diagram of the elements used in performing the receive task of the present invention.

FIG. 5 shows an exemplary block diagram of the portion of the switch controller 23 dedicated to processing received data packets. This portion, i.e., the receive controller 40 (preferably a state machine), is preferably comprised of multiple state machines, each of which concurrently processes portions of a receive task 90. Preferably, by forming operational portions of the receive task 90 as state machines, different portions of the various tasks used for receiving data from multiple MACS 18 can be performed concurrently. The primary state machines are (1) a main receive state machine 92 for exercising supervisory control over the other state machines, controlling the flow of data between the operational blocks, and controlling requests for packet memory buffers 70 and 64 byte subpackets according to the descriptors 74 stored in the session registers 76 (2) a receive ring state machine 94 for controlling the storage of descriptors 74 and destination vector pointers 80 into one or port queues 78, (3) a receive session state machine 96 for controlling access to the descriptors 74 stored in the session registers 76, (4) a buffer allocator 98 for allocating (and deallocating, e.g., in the case of a data packet received with a CRC error) buffers 70 in the packet memory 20, and (5) an address table state machine 100 for determining the destination port or ports according to the destination address 60 of the received data packet 54. Additionally, an arbiter 102 is used to control the submission of tasks to the state machines of the receive controller 40 on a per port basis, preferably in a round robin fashion based upon status data returned from each MAC 18 and/or a data available signal 103 from the MAC receive buffer 30. Alternatively, the arbiter 102 can submit tasks based on other criterion, e.g., the transmission speed of the port (10 Mbps, 100 Mbps, 1000 Mbps), the probability of an additional packet being received inversely based on when the last packet was received, etc.

Figure 6:
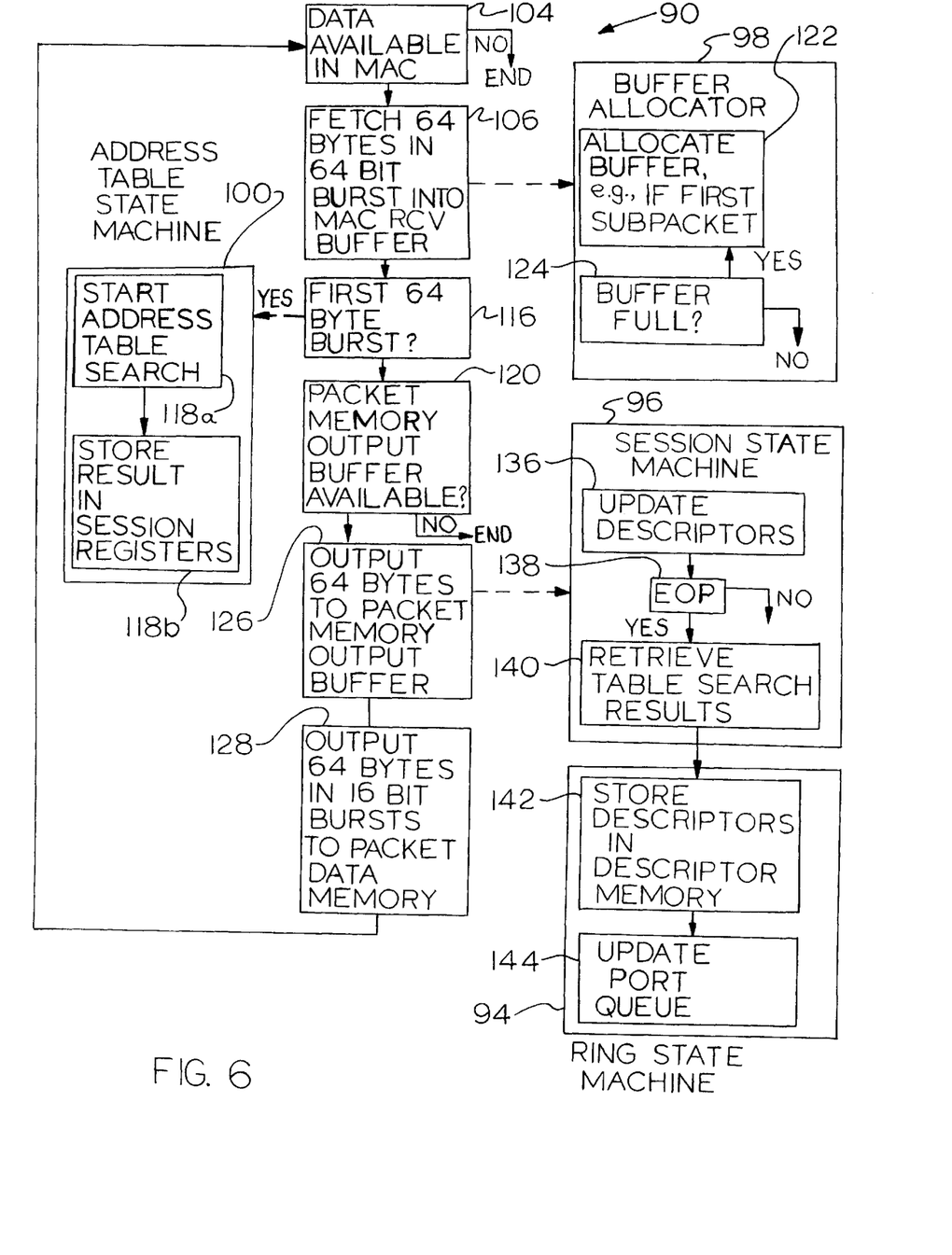
FIG. 6 shows an exemplary flow chart of the receive task of the present invention which utilizes multiple concurrent state machines.

As shown in FIG. 6, the exemplary receive task 90 (shown for a single port as selected by the arbiter 102 once data is first detected in the selected MAC 18) begins in block 104 where the task waits by periodically polling the MAC 18 for the selected port to determine if data is available. In block 106, a burst of data (64 bytes in this exemplary embodiment) is fetched from the selected MAC 18. Preferably, each MAC 18 has a receive buffer 108, e.g., a first in first out buffer (FIFO), that provides the oldest buffered data across the bidirectional MAC interface bus 31 (see FIG. 2), common to all of the MACs 18, to the MAC receive buffer 30. Preferably, the MAC receive buffer 30 is comprised of a receive first in first out buffer (FIFO) 110 under control of a receive FIFO controller 112 operating in coordination with a high speed shared data bus interface 114 to control the transfer data across the MAC interface bus 31. In a preferred embodiment, the FIFO controller 112 independently controls this data transfer once it receives a command from the receive controller 40. In this exemplary embodiment, the MAC interface bus 31 and the data bus interface 114 are 64 bits wide. Accordingly, the data bus interface 114 is used to fetch and load the 64 byte MAC receive buffer 30 in eight 64 bit bursts. Since the MAC receive buffer 30 is preferably organized as a FIFO, it can receive data at a first rate from the MACs 18 via the MAC interface bus 31 and send this received data or portion of this data toward the packet memory 20 at a second rate, i.e., the data transfers can overlap.

Once the first 64 bytes have been received into the MAC receive buffer 108 in block 116, a search begins in block 118a to determine the destination port according to the data contained within the first 6 bytes of the incoming data packet, i.e., the destination address 60, using the address table state machine 100 which processes the contents of the address table 38. The address table state machine 100 proceeds independently and since this task begins early in the receive task 90, sufficient time is allocated for it to complete (in block 118b where the results are stored in the receive session registers 76) before the end 68 of the data packet 54 is reached.

It is then determined in block 120 whether the packet memory output buffer 36 is available. In the exemplary receive task 90 of FIG. 6, it is shown that the buffer allocator 98 begins in response to receipt of the first 64 byte portion, a subpacket or subportion of a data packet, of buffer 70. Once buffer 70 is allocated by the buffer allocator 98, the associated descriptor 74 in the receive session registers 76 is updated and maintained by the concurrently operating receive session state machine 96. There are up to four 64 byte subpackets per 256 byte buffer 70 and this is tracked within a subpacket field of each descriptor 74 in the receive session registers 76. Buffer 70 is allocated (in block 122) from the packet memory 20 whenever it is determined (e.g., in block 124) that the next subpacket will require a new 256 byte buffer, i.e., four of four 64 byte subpackets have been used. Again, the buffer allocator 98 is preferably a separate state machine that operates concurrently with the other tasks. The simplified buffer allocator 98 of FIG. 6 shows buffer allocation beginning when each new buffer 70 is needed. However, in an alternative preferred embodiment, this allocation task actually begins by always having the next free buffer 70 allocated in advance so that a new buffer is always available when needed. This alternative embodiment is possible as a consequence of the use of independent state machines.

Each 64 byte subpacket is stored (see blocks 126 and 128) in the allocated buffer portion of the packet memory 20 described by the current session register 76 and maintained by the receive session state machine 96. Actually, this process occurs in two stages. First, the 64 byte subpacket is stored in the packet memory output buffer 36. Next, the contents of the output buffer 36 are sent to packet memory 20 via a packet memory interface 130 and the bidirectional packet memory interface bus 35 (see FIG. 2), preferably using circuitry similar to that described in reference to the MAC receive buffer 30, e.g., a controller 132 that independently controls the transfer of data into a FIFO 134 once it receives a command from the receive controller 40. In an exemplary embodiment, the bidirectional packet memory interface bus 35 is 16 bits wide. Accordingly, the transfer of the 64 byte subpacket requires a burst transfer of thirty-two 16 bit quantities. The packet memory output buffer 36 is preferably implemented as a FIFO (similar to the MAC receive buffer 30), permitting data to be written into the packet memory 20 at a different rate than it is written into the packet memory output buffer 36. This structure is advantageous to accommodate the different bus widths (16 bit external vs 64 bit internal) and different external and internal clock rates.

Once the process of sending each subpacket to the packet memory commences (in blocks 126 and 128), the descriptors 74 are updated by the receive session state machine 92 in block 136. If an end of packet (EOP) 64 has been detected in block 138, the results of the address table search of block 118 are retrieved from the address table state machine 100 in block 140 (e.g., from data stored in the receive session registers 76) and submitted to the concurrently operating ring state machine 94. In the case of a unicast message where the destination address 60 is known to the address table 38, the received data packet 54 is forwarded to the port which contains a device corresponding to the destination address 60. Otherwise, the address table state machine 100 updates the address table 38 according to the contents of the source address 62 and forwards the received data packet 54 to all ports with the exception of the port which received the data packet, i.e., floods the data ports with the received data packet. This task is done in block 142 by storing the descriptors 74 and the destination port vector 82 for the received data packet 54 in one or more output queues 78 in the descriptor memory 22. The write pointer 86 for each of the updated output queues 78 is accordingly updated in block 144. Following updating the write pointer 86, there will be a difference between the write pointer 86 and the read pointer 88 and it is this difference that is detected by the transmit controller 42 in determining whether there are data packets to be output on each port.

Each of the aforementioned blocks perform portions of the receive task 90. The arbiter 102 preferably allows only a portion, e.g., one task block, of the receive task 90 to complete before moving on, e.g., in a round robin manner, to complete a portion of the receive task 90 for a next port. As a consequence of the aforementioned structure, different portions of each receive task 90 can occur concurrently for each port using shared resources while maintaining data in buffers 70 within a common packet memory 20. For example, a first port could be beginning receipt of a data packet 54a into its MAC 18a, a second port could have received a first 64 bytes into its MAC 18b and could be transferring 64 bytes into the MAC receive buffer 30, and a third MAC 18c could have received a second portion of a data packet into its internal FIFO 108 and could be awaiting its transfer to the MAC receive buffer 30 which is currently busy. Similar overlapping uses of the structure of the receive controller 40 occur throughout.

Figure 7:
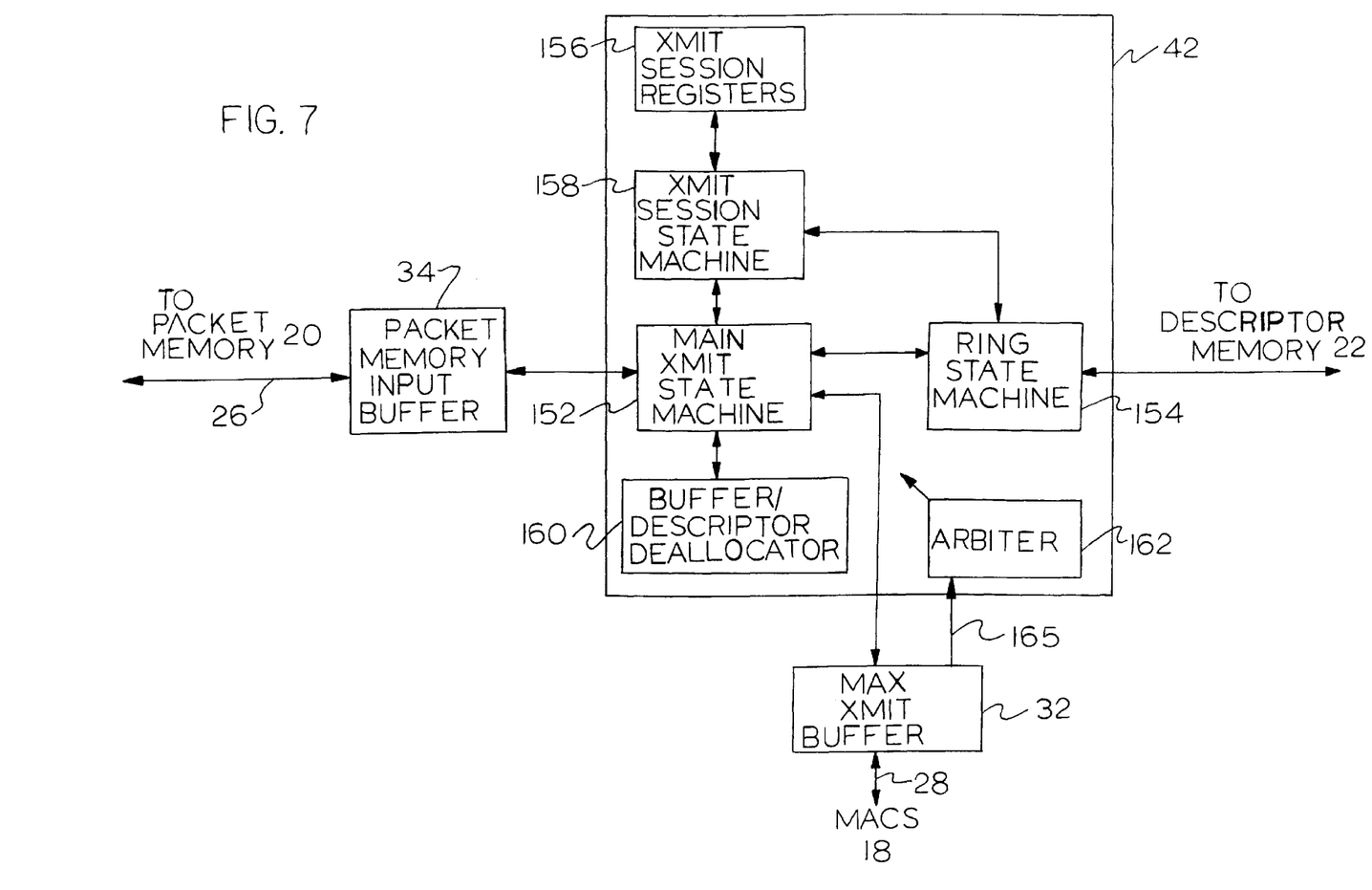
FIG. 7 shows an exemplary functional block diagram of the elements used in performing the transmit task of the present invention.

FIG. 7 shows an exemplary block diagram of the portion of the switch controller 23 dedicated to transmitting data packets. This portion, i.e., the transmit controller 42 (preferably a state machine), is preferably comprised of multiple state machines, each of which concurrently processes portions of a transmit task 150. Preferably, by forming operational portions of the transmit task 150 as state machines, different portions of the various tasks used for transmitting data to multiple MACS 18 can be performed concurrently. The primary state machines are (1) a main transmit state machine 152 for exercising supervisory control over the other state machines, controlling the flow of data between the operational blocks, and controlling access to 64 byte subpackets within the buffer 70 pointed to by the current session register 76, (2) a transmit ring state machine 154 for controlling the retrieval of: descriptors 74 and the destination vector pointer 80 from port queues 78 into internal transmit session registers 156, (3) a transmit session state machine 158 for controlling access to the transmit session registers 156, and (4) a buffer deallocator 160 for deallocating buffers 70 in the packet memory 20. Additionally, an arbiter 162 is used to control the submission of tasks to the state machines of the transmit controller 42 on a per port basis, preferably in a round robin fashion. Alternatively, the arbiter 162 can submit tasks based on other criterion, e.g., the transmission speed of the port (10 Mbps, 100 Mbps, 1000 Mbps), the probability of an additional packet being received inversely based on when the last packet was transmitted, etc.

Figure 8:
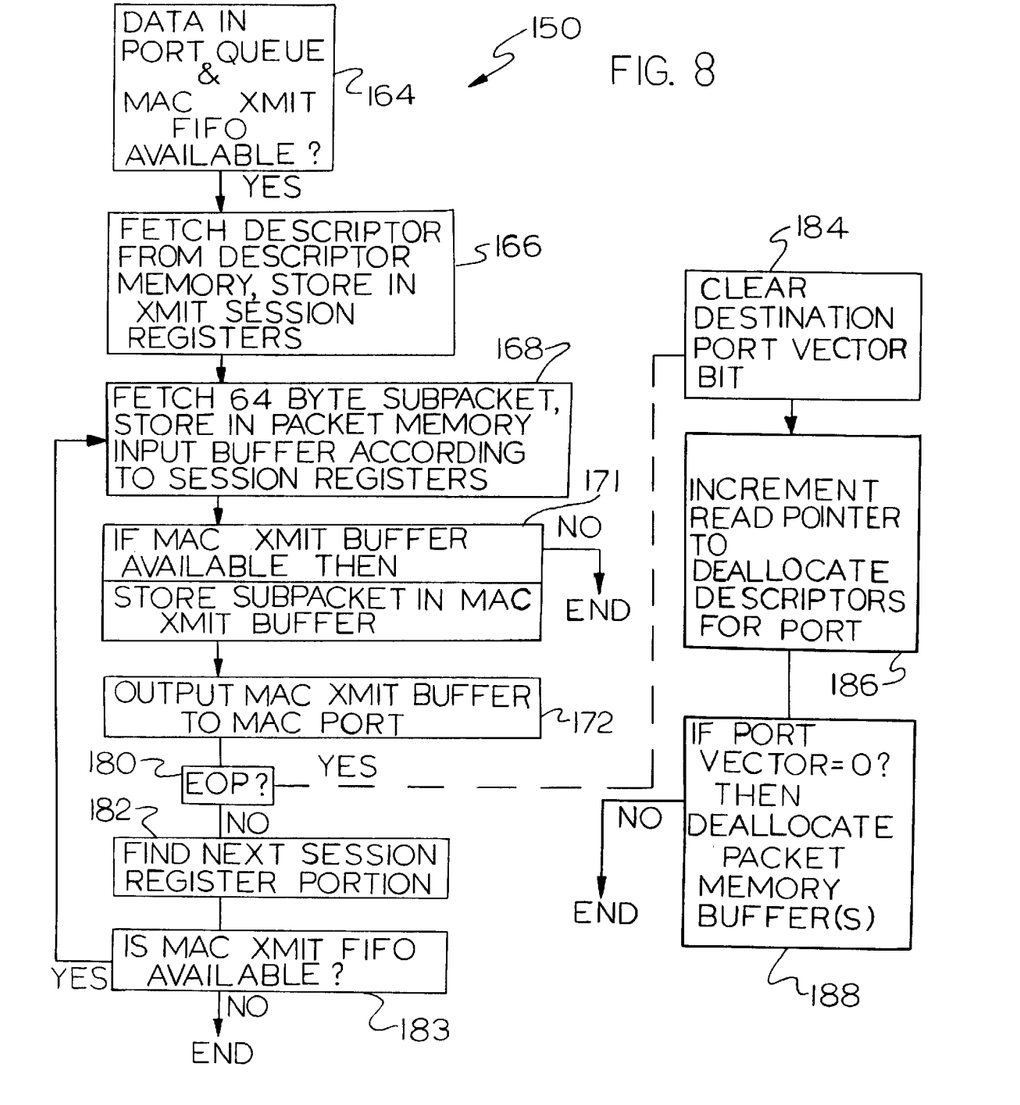
FIG. 8 shows an exemplary flow chart of the transmit task of the present invention which utilizes multiple concurrent state machines.

As shown in FIG. 8, the exemplary transmit task 150 (shown for a single port as selected by the arbiter 162 once data is first detected in the selected port queue 78) begins in block 164 where the task periodically (1) compares the write 86 and read 88 pointers for the selected port to determine if the selected port queue 78 has data, i.e., a data packet is available for transmission, and (2) if the MAC transmit FIFO 178 is available to receive data, e.g., by polling a space available line 165. If a data packet and the MAC transmit FIFO 178 are available, the task continues in block 166 where descriptors 74 are fetched from the port queue 78 in the descriptor memory 22 and stored in the transmit session registers 156. Next, in block 168, a 64 byte subpacket is retrieved into the packet memory input buffer 34 from the buffer 70 in the packet memory 20 pointed to by the transmit session registers 156. Preferably the packet memory input buffer 34 is configured as a FIFO operating in a similar manner to that described in reference to the MAC receive buffer 30, e.g., a controller 169 independently controls the transfer of data into a FIFO 170 once it receives a command from the transmit controller 42. In block 171, it is determined if the MAC transmit buffer 32 is available and, if so, a 64 byte subpacket is transferred to the MAC transmit buffer 32. The MAC transmit buffer 32 is preferably comprised of a transmit FIFO 174 and a transmit FIFO controller 176 which independently controls the transfer of the subpacket to a transmit FIFO 178 within the designated MAC 78 via the high speed shared data bus interface 114 and the MAC interface bus 31 once it receives a command from the transmit controller 42. In block 180, it is determined if the current subpacket contains the EOP 68. If not, the transmit session state machine 158 is updated in block 182 to point to the next subpacket in the packet memory 20 and, in block 183, it is determined if the MAC transmit FIFO 178 is available to accept more data. If so, the process continues with block 168 fetching the next 64 byte subpacket. If the EOP 68 has been detected, the buffer deallocator 160 (in block 184) clears the bit corresponding to the selected port in the destination port vector 82 and the ring state machine 154 concurrently updates the read pointer 88 to deallocate the descriptors 74 in the selected port queue 78 in block 186. Providing that all bits the destination port vector 82 are now cleared, the buffer deallocator 160 (in block 188) deallocates the buffers 70 used to store the data packet. However, if bits are still set in the destination port vector 82, it signifies that other port queues 78 will still be transmitting the stored data packet and, thus, the buffers 70 are retained.

Each of the aforementioned blocks perform portions of the transmit task 150. The arbiter 162 preferably allows only a portion, e.g., one task block, of the transmit task 150 to complete before moving on, e.g., in a round robin manner based upon status from each MAC 18 and/or status data on the space available line 165 from the MAC transmit buffer 32, to complete a portion of the transmit task 150 for a next port. As a consequence of the aforementioned structure, different portions of each transmit task 150 can occur concurrently using shared resources while operating on data packets in buffers 70 within the common packet memory 20. For example, a first MAC 18a could begin transmitting a portion of a data packet 54a from within its MAC transmit FIFO 178, a first 64 bytes of data packet 54b could have been transferred into the MAC transmit buffer 32 and could now be transferring its contents to the MAC transmit FIFO 178 in MAC 18b, and the transmit controller 42 could be awaiting the availability of the MAC transmit FIFO 178 in MAC 18c before transferring a 64 byte subpacket of the data packet 54c from the packet memory 20 to the MAC transmit buffer 32 which is currently busy. Similar overlapping uses of the structure of the transmit controller 42 occur throughout.

Figure 9:
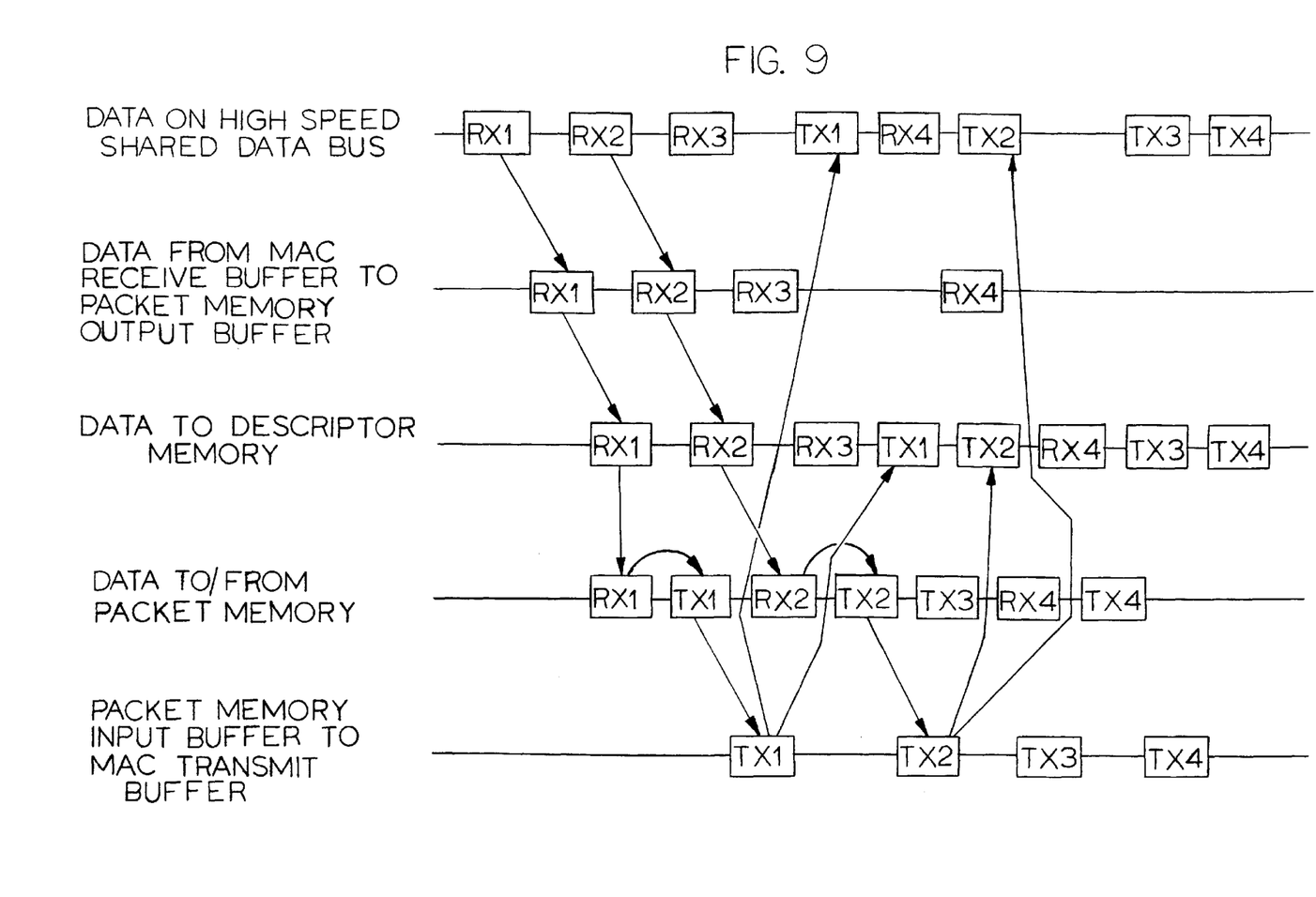
FIG. 9 shows an exemplary timeline showing multiple receive and transmit tasks concurrently using different shared resources to concurrently receive and transmit data packets on a plurality of LANs.

Since the receive 40 and transmit 42 controllers operate essentially independently, they can concurrently perform portions of their tasks for each of a plurality of LAN ports. Additionally, as previously described, the receive 40 and transmit 42 controllers are preferably comprised of a plurality of controllers, e.g., state machines, that each operate concurrently to perform portions of the receive and transmit tasks. For example, FIG. 9 shows exemplary receive 90 and transmit 150 tasks overlapping in the present invention (for simplicity, this is shown in the case where the data packet size is 64 bytes, i.e., a subpacket is the same as a packet). A first receive task RX1 (on a first port) is shown placing a 64 byte packet on the MAC interface bus 31. Next, the packet is stored into the MAC receive buffer 30. A buffer 70 is then allocated and pointed to by the receive session registers 76 to control the transfer of data from the packet memory 20 to the packet memory output buffer 36. This sequence of operations is shown concurrently overlapping a different portion of the receive task 90 on a second port. This is possible since the receive task 90 has been subdivided to permit different portions of the task to be performed on different portions of the shared resources. Additionally, due to the buffering on the interfaces to the shared resources, each port can withstand at least a packet (64 byte) transmission delay time without any data loss. Similarly, multiple transmit tasks 150, e.g., TX1, TX2, etc., can overlap each other as well as the receive tasks which can overlap each other as well as concurrent transmit tasks, e.g., TX1 data on the MAC interface bus 31 is shown overlapping TX2 data coming from the packet memory 20 and RX3 descriptor data being entered into the descriptor memory 22. Again, this is possible since each task is accessing different portions of the shared resources while maintaining intermediate data within the buffered data interfaces.

The described architecture of the switch controller (see FIG. 2) is conducive to being implemented within a single integrated circuit package, e.g., an application specific integrated circuit (ASIC), with the packet 20 and descriptor 22 memories and the MACs 18 being external to the single integrated circuit package. In a preferred embodiment, these external memories are commercially produced off-the-shelf RAM (or any other read/write memory) and the MACs are also readily available off the shelf devices. For example, currently used MACS are commercially available devices that support eight ports, i.e., octal MACs. Using such a device, allows the component count to be further minimized. However, it should be noted that for descriptive purposes each described aforementioned MAC 18 would then refer to one of the eight ports within such a device.

Although the present invention has been described in detail with reference only to the presently-preferred embodiments, those of ordinary skill in the art will appreciate that various modifications can be made without departing from the invention. For example, while Ethernet type LANs have been described, one of ordinary skill in the art will appreciate that the present invention is applicable to other data transfer protocols as well. Accordingly, the invention is defined by the following claims.

We claim:

1. A system for selectively transferring data packets between a plurality of local area networks (LANs), wherein said data packets identify destination and source addresses, said system comprising:

a plurality of media access controllers (MACs) each configured for receiving and transmitting data packets to and/or from a different LAN; said MACS including at least a first MAC associated with a first LAN for receiving data packets from said first LAN and a second MAC associated with a second LAN for transmitting data packets to said second LAN;

a shared data bus;

each of said MACs connected to said shared data bus for presenting data packets for transfer across said data bus;

a MAC receive buffer including a controller for transferring data packets presented by said MACs across shared data bus and for buffering at least a portion of said transferred data packets;

a MAC transmit buffer including a controller capable of operating concurrently with said MAC receive buffer controller for transferring data packets across said shared data bus and for buffering at least a portion of said transferred data packets;

a shared packet memory for storing a plurality of data packets;

a packet memory input buffer for periodically receiving and buffering at least a portion of data packets from said packet memory;

a packet memory output buffer capable of operating concurrently with said packet memory input buffer for periodically buffering and transmitting at least a portion of data packets to said packet memory;

a shared descriptor memory for storing descriptors pointing to said data packets stored within said packet memory;

an address table for correlating the destination address of each data packet with one of said MACs;

a receive controller for transferring a data packet from said MAC receive buffer to said packet memory via said packet memory output buffer and for generating descriptors corresponding to the locations of said data packet within said packet memory; wherein said receive controller stores said descriptors in said descriptor memory in response to said address table and the destination address of said data packet; and a transmit controller capable of operating concurrently with said receive controller for transferring a data packet from said packet memory to said MAC transmit buffer via said packet memory input buffer according to descriptors stored within said descriptor memory.

2. The system of claim 1 wherein each of said receive and transmit controllers are state machines.

3. The system of claim 1 wherein said MAC receive buffer, said MAC transmit buffer, said packet memory input buffer, said packet memory output buffer, said receive controller, and said transmit controller are implemented within a single integrated circuit package.

4. The system of claim 1 additionally comprising:

receive session registers for storing descriptors generated by said receive controller before said descriptors are stored in said descriptor memory;

transmit session registers for storing descriptors retrieved from said descriptor memory; and wherein said transmit controller is responsive to said retrieved descriptors within said transmit session registers for selecting data packets from said packet memory for transmission to said MACs.

5. The system of claim 4 wherein said MAC receive buffer, said MAC transmit buffer, said packet memory input buffer, said packet memory output buffer, said receive controller, said transmit controller, said receive session registers, and said transmit session registers are implemented within a single integrated circuit package.

6. The system of claim 1 wherein said MAC receive buffer, said MAC transmit buffer, said packet memory input buffer, said packet memory output buffer are each organized as first in first out buffers (FIFOs) capable of inputting data at a first rate and outputting data at a second rate.

7. In a system comprised of (1) a plurality of media access controllers (MACs) each configured for receiving and transmitting data packets to and/or from a different local area networks (LAN), said MACS including at least a first MAC associated with a first LAN for receiving and buffering data packets from said first LAN and a second MAC associated with a second LAN for transmitting data packets to said second LAN, (2) a shared packet memory for storing a plurality of data packets, and (3) a shared descriptor memory for storing descriptors pointing to said data packets stored within said packet memory, wherein said data packets identify destination and source addresses, a switch controller for selectively transferring data packets between a plurality of LANs via said MACS, said switch controller comprising:

a shared data bus;

each of said MACs connected to said shared data bus for presenting data packets for transfer across said data bus;

a MAC receive buffer including a controller for transferring data packets presented by said MACs across shared data bus and for buffering at least a portion of said transferred data packets;

a MAC transmit buffer including a controller capable of operating concurrently with said MAC receive buffer controller for transferring data packets across said shared data bus and for buffering at least a portion of said transferred data packets;

a packet memory input buffer for periodically receiving and buffering at least a portion of data packets from said packet memory;

a packet memory output buffer capable of operating concurrently with said packet memory input buffer for periodically buffering and transmitting at least a portion of data packets to said packet memory;

an address table for correlating the destination address of each data packet with one of said MACs;

a receive controller for transferring a data packet from said first MAC to be stored in said packet memory via said MAC receive buffer to said packet memory via said packet memory output buffer and for generating descriptors corresponding to the locations of said data packet within said packet memory; wherein said receive controller stores said descriptors in said descriptor memory in response to said address table and the destination address of said data packet; and a transmit controller capable of operating concurrently with said receive controller for transferring a data packet from said packet memory to said MAC transmit buffer via said packet memory input buffer according to descriptors stored within said descriptor memory.

8. The switch controller of claim 7 wherein each of said receive and transmit controllers are state machines.

9. The switch controller of claim 7 wherein said MAC receive buffer, said MAC transmit buffer, said packet memory input buffer, said packet memory output buffer, said receive controller, and said transmit controller are implemented within a single integrated circuit package.

10. The switch controller of claim 7 additionally comprising:

receive session registers for storing descriptors generated by said receive controller before said descriptors are stored in said descriptor memory;

transmit session registers for storing descriptors retrieved from said descriptor memory; and wherein said transmit controller is responsive to said retrieved descriptors within said transmit session registers for selecting data packets from said packet memory for transmission to said MACs.

11. The switch controller of claim 10 wherein said MAC receive buffer, said MAC transmit buffer, said packet memory input buffer, said packet memory output buffer, said receive controller, said transmit controller, said receive session registers, and said transmit session registers are implemented within a single integrated circuit package.

12. The switch controller of claim 7 wherein said MAC receive buffer, said MAC transmit buffer, said packet memory input buffer, said packet memory output buffer are each organized as first in first out buffers (FIFOs) capable of inputting data at a first rate and outputting data at a second rate.

* * * * *